(12) United States Patent
Ernst

(10) Patent No.: US 10,745,904 B2
(45) Date of Patent: Aug. 18, 2020

(54) METHOD AND CONNECTOR SET FOR CONNECTING BEAMS OF WOOD MATERIAL

(71) Applicant: SWG Schraubenwerk Gaisbach GmbH, Waldenburg (DE)

(72) Inventor: Henning Ernst, Rülzheim (DE)

(73) Assignee: SWG Schraubenwerk Gaisbach GmbH, Waldenburg (DE)

( * ) Notice: Subject to any disclaimer, the term of this patent is extended or adjusted under 35 U.S.C. 154(b) by 0 days.

(21) Appl. No.: 16/080,240

(22) PCT Filed: Mar. 20, 2017

(86) PCT No.: PCT/EP2017/056563
§ 371 (c)(1),
(2) Date: Aug. 27, 2018

(87) PCT Pub. No.: WO2017/162590
PCT Pub. Date: Sep. 28, 2017

(65) Prior Publication Data
US 2019/0048574 A1   Feb. 14, 2019

(30) Foreign Application Priority Data
Mar. 24, 2016   (DE) .................. 10 2016 204 921

(51) Int. Cl.
*E04B 1/26* (2006.01)
*E04B 1/41* (2006.01)
*F16B 25/00* (2006.01)

(52) U.S. Cl.
CPC .............. *E04B 1/2604* (2013.01); *E04B 1/40* (2013.01); *E04B 2001/2648* (2013.01); *E04B 2001/2652* (2013.01); *F16B 25/0015* (2013.01)

(58) Field of Classification Search
CPC .. E04B 1/2604; E04B 1/40; E04B 2001/2652; E04B 2001/2648; F16B 25/0015
(Continued)

(56) References Cited

U.S. PATENT DOCUMENTS 1,377,891 A * 5/1921 Knight .................... E04C 3/122
52/841
2,311,537 A * 2/1943 Giuseffi ............... A47C 19/005
5/286

(Continued)

FOREIGN PATENT DOCUMENTS

CA    2703401 A1 * 11/2011 ............... E04B 1/26
CH    680674    10/1992
(Continued)

OTHER PUBLICATIONS

Blomberger Holzindustrie B. Hausmann GmbH & Co. KG (2 pages).

*Primary Examiner* — Patrick J Maestri
*Assistant Examiner* — Joseph J. Sadlon
(74) *Attorney, Agent, or Firm* — Boyle Fredrickson S.C.

(57) ABSTRACT

The invention relates to a method and to a connector set for connecting beams from wood material, in particular solid wood, glued laminated wood, laminated veneer wood, or plywood board, in particular for connections that are under a compressive as well as a tensile load, wherein a connector has at least one plate-shaped portion for insertion into prefabricated slots in the beam or the beams, wherein at least the plate-shaped portion of the connector is composed of synthetic resin densified wood, wherein the synthetic resin densified wood is composed of a plurality of hardwood layers disposed on top of one another and synthetic resin, and wherein wood screws for fixing the connector are provided.

19 Claims, 5 Drawing Sheets

(58) Field of Classification Search
USPC .................................................... 52/309.16
See application file for complete search history.

(56) References Cited

U.S. PATENT DOCUMENTS

| | | | | |
|---|---|---|---|---|
| 2,521,381 | A * | 9/1950 | Linck | E04B 1/26 52/262 |
| 2,542,151 | A * | 2/1951 | McAuliffe, Jr. | E04B 1/26 52/92.1 |
| 2,999,571 | A * | 9/1961 | Huber | F16B 19/14 411/441 |
| 3,285,636 | A * | 11/1966 | Hoyle, Jr. | E04B 1/2604 403/230 |
| 3,460,308 | A * | 8/1969 | Stucky | E04B 1/2612 52/745.02 |
| 3,890,759 | A * | 6/1975 | Selden | E04B 1/2604 403/217 |
| 3,961,455 | A * | 6/1976 | Peters | E04B 1/2612 52/693 |
| 4,052,832 | A * | 10/1977 | Jungers | E04B 1/32 52/586.1 |
| 4,299,509 | A * | 11/1981 | Meickl | E04B 1/2604 403/252 |
| 4,398,841 | A * | 8/1983 | Kojima | E04B 1/2604 403/173 |
| 4,551,958 | A * | 11/1985 | Reneault | E04F 13/007 52/309.4 |
| 4,558,968 | A * | 12/1985 | Meickl | E04B 1/2604 403/174 |
| 4,905,440 | A * | 3/1990 | Schilger | E04C 3/293 52/368 |
| 5,295,754 | A * | 3/1994 | Kato | E04B 1/26 403/174 |
| 5,377,732 | A * | 1/1995 | Fujii | B27M 3/002 144/347 |
| 5,617,694 | A * | 4/1997 | Baba | E04B 1/2604 403/12 |
| 5,620,275 | A * | 4/1997 | Novacek | E04B 1/2604 403/230 |
| 5,636,934 | A * | 6/1997 | Nakanishi | E04B 1/2604 403/230 |
| 5,966,892 | A * | 10/1999 | Platt | E04B 1/26 403/386 |
| 6,006,803 | A * | 12/1999 | Nakanishi | B27F 5/02 144/345 |
| 6,192,636 | B1 * | 2/2001 | Hayashi | E02D 27/01 52/126.7 |
| 6,219,989 | B1 * | 4/2001 | Tumura | E04B 1/2403 52/274 |
| 6,644,607 | B2 * | 11/2003 | Lehtonen | B60R 11/0241 248/220.22 |
| 6,669,396 | B2 * | 12/2003 | Mattle | E04B 1/2604 29/428 |
| 6,739,815 | B2 * | 5/2004 | Takasaki | F16B 25/0015 411/387.1 |
| 6,941,635 | B2 * | 9/2005 | Craven | F16B 5/0275 29/525.11 |
| 7,677,854 | B2 * | 3/2010 | Langewiesche | F16B 25/00 411/386 |
| 7,874,125 | B2 * | 1/2011 | Polk, Jr. | B29C 45/1615 52/831 |
| 8,347,581 | B2 * | 1/2013 | Doerr | E04B 1/4178 52/379 |
| 8,997,437 | B2 * | 4/2015 | Wu | E04C 3/20 52/223.8 |
| 9,163,415 | B2 * | 10/2015 | Nies | A47B 96/061 |
| 9,249,574 | B2 * | 2/2016 | Mei | E04B 5/12 |
| 9,493,946 | B2 * | 11/2016 | Foderberg | E04C 2/049 |
| 9,784,296 | B2 * | 10/2017 | Vandenberg | B25B 23/00 |
| 9,797,149 | B2 * | 10/2017 | Lavery | E04H 1/1205 |
| 2002/0104943 | A1 * | 8/2002 | Lehtonen | B60R 11/0241 248/300 |
| 2006/0130414 | A1 * | 6/2006 | Walther | A47F 5/0846 211/94.01 |
| 2007/0090073 | A1 * | 4/2007 | Blum | A47F 5/0846 211/94.01 |
| 2008/0148678 | A1 * | 6/2008 | Wolf | E04B 1/26 52/653.1 |
| 2008/0282644 | A1 * | 11/2008 | Hong | E04C 3/293 52/847 |
| 2010/0287878 | A1 * | 11/2010 | Lee | E04C 3/293 52/834 |
| 2012/0023858 | A1 * | 2/2012 | Lee | E04C 5/0645 52/636 |
| 2017/0209990 | A1 * | 7/2017 | Irwin | B25B 21/002 |

FOREIGN PATENT DOCUMENTS

| | | | |
|---|---|---|---|
| DE | 862659 | 1/1953 | |
| DE | 4124553 A1 * | 3/1992 | ........... E04B 1/2604 |
| DE | 29621923 | 4/1998 | |
| EP | 2639463 | 9/2013 | |
| JP | 5337732 B2 * | 11/2013 | ........... F16B 25/0031 |
| WO | WO-2004042172 A1 * | 5/2004 | ........... E04F 13/083 |

* cited by examiner

METHOD AND CONNECTOR SET FOR CONNECTING BEAMS OF WOOD MATERIAL

BACKGROUND

The invention relates to a method for connecting beams from solid wood or glued laminated wood, and to a connector set for beams from wood material, in particular solid wood, glued laminated wood, laminated veneer wood, or plywood board, in particular for connections that are under a compressive as well as a tensile load, wherein the connector set has at least one connector having at least one plate-shaped portion for insertion into prefabricated slots in the beam or the beams, wherein at least the plate-shaped portion of the connector is composed of synthetic resin densified wood, and wherein the synthetic resin densified wood is composed of a plurality of hardwood layers disposed on top of one another and synthetic resin.

Known connectors for beams from solid wood or glued laminated wood, which can be used for connections that are under a compressive as well as a tensile load, are composed of metal plates which are inserted into prefabricated slots in a beam or a plurality of beams. The metal plates have through openings. Upon insertion of the steel plates, the latter are secured in the beams by rod dowels which usually are likewise composed of steel. To this end, the beams have to be drilled, wherein the difficulty lies in precisely hitting the through openings in the steel plates.

A connector for beams from solid wood or glued laminated wood in which steel plates that are not pre-perforated are used is known from German patent document DE 197 24 285 C2. Special rod dowels which on the tip thereof have a drill portion and can drill through both the beam as well as the steel plate are used for fixing the steel plates.

A rod connection for timber framing by means of connector plates, in which the connector plates are composed of compressed artificial wood is known from German patent document DE 862 659 B. Instead of the final connector plates, connector plates from a more readily workable material such as plywood or hardboard are initially fitted in the joining of a framework and after drilling are used as templates for the final connector plates. The pre-drilled connector plates from compressed artificial wood are then fitted to the framework members to be connected. Both the framework members as well as the connector plates in this instance are pre-drilled, and dowels are inserted into the pre-drilled openings. Care is to be taken herein that the hole diameter in the connector plates is somewhat larger than the hole diameter in the framework members.

SUMMARY

An improved method for connecting beams of wood material and an improved connector are to be specified by the invention.

The object on which the invention is based is achieved by a method for connecting beams from solid wood or glued laminated wood, comprising the following steps: producing slots in the beams; introducing a connector from synthetic resin densified wood into the slots; and fixing the connector in the slots by means of wood screws.

The particular advantage of the method according to the invention lies in that the connectors do not have to be pre-drilled. Rather, a carpenter when installing a timber construction can pre-drill the beams having the connectors inserted into the slots of the beam using conventional wood drill bits and then insert the wood screws. The method according to the invention is particularly advantageous when the connectors are fixed in the slots of the beams by means of wood screws. Conventional wood screws can be used in such a case, and in particular no pre-drilling whatsoever of the beam or the connector is required.

In a refinement of the invention the wood screws are screwed into the beams and the connector without pre-drilling the beams and the connector.

Wood screws having drill tips are advantageously used.

In this way, even the connectors composed of a very hard and resistant synthetic resin densified wood can be penetrated by means of the wood screws without pre-drilling.

In a refinement of the invention wood screws having a full thread are used.

Fixing the connectors in all directions of movement is possible by means of wood screws having a full thread.

In a refinement of the invention wood screws having at least one thread-free portion can also be used.

Depending on the application, one or a plurality of thread-free portions on the wood screws can be advantageous, for example when any pre-tensioning is to be applied by means of the wood screw.

In a refinement of the invention the wood screws are arranged such that the connector in the finally assembled state is penetrated by a thread-free portion of the wood screws.

Fixing of the connector which corresponds substantially to the fixing by means of rod dowels is achieved in this way.

According to the invention, to this end a connector set for beams of wood material, in particular for connections that are under a compressive as well as a tensile stress, is also provided, wherein the connector set has at least one connector having at least one plate-shaped portion for insertion into prefabricated slots in the beam or the beams, wherein at least the plate-shaped portion of the connector is composed of synthetic resin densified wood, wherein the synthetic resin densified wood is composed of a plurality of hardwood layers disposed on top of one another and synthetic resin, and wherein the connector set has a plurality of wood screws which are provided for fixing the at least one connector in the beams.

It is surprisingly possible for the known metal plates, for example steel or aluminum plates, in the case of beam connectors to be replaced by plates from synthetic resin densified wood. Such synthetic resin densified wood plates can be worked using woodworking tools and can also be drilled through by means of wood screws. In this way it is possible for a non-pre-drilled connector plate from synthetic resin densified wood to be fixed in a beam by means of wood screws. On account thereof, the laborious connection of drilling templates or special drill bits for steel, such as those which had to be used to date, can be entirely avoided. It has been surprisingly demonstrated herein that connectors from synthetic resin densified wood can readily withstand the loads in the case of connections of beams in carpentry constructions. This holds true even when a beam connection is under a compressive as well as a tensile load. A further advantage of the invention is derived in terms of fire safety. The known disadvantages of connectors from steel do not arise in the case of connectors from synthetic resin densified wood. In the context of the invention a plurality of connectors can be inserted into slots that are disposed so as to be mutually parallel.

In a refinement of the invention the plurality of wood screws have in each case one drill tip.

In that the wood screws are provided with a drill tip the connector which is composed of very hard and hard-to-penetrate synthetic resin densified wood can also be penetrated without a problem.

The wood screws according to the invention can be configured as fully-threaded screws, or else have at least one thread-free portion.

In a refinement of the invention the wood screws have at least one thread-free portion, wherein the thread-free portion is disposed between two threaded portions.

By means of such wood screws it can be achieved, for example, that the connector or else the plurality of connectors in the completely assembled state of the wood screws are in each case penetrated by a thread-free portion. On account thereof, the connectors can be fixed in the beams in a manner similar to that when fixed by means of rod dowels. The thread-free portions in this instance have to be adapted to the position of the connectors in the beam.

The plate-shaped portion can be configured so as to be rectangular or T-shaped. The shapes that are usual in connectors from steel plates can be readily produced by means of the connectors according to the invention from synthetic resin densified wood. On account thereof, tools that are already available can be readily continued to be used for producing the slots in the beams.

In a refinement of the invention the synthetic resin is a duromeric synthetic resin. The synthetic resin densified wood is composed of a plurality of hardwood layers which are then connected to one another using a duromeric or thermosetting synthetic resin which thus can no longer be deformed after curing, said hardwood layers optionally also being penetrated by the synthetic resin. A composite that is very stable and resistant to high loads results on account thereof.

A tensile strength of the synthetic resin densified wood used, parallel with the hardwood layers, is advantageously more than 75 N/mm$^2$. A compressive strength parallel with the hardwood layers is advantageously between 110 and 150 N/mm$^2$, and a compressive strength perpendicular to the hardwood layers is advantageously between 250 and 310 N/mm$^2$.

An elasticity modulus of the synthetic resin densified wood, perpendicular to the hardwood layers, when flexurally stressed, is advantageously between 15,500 and 18,500 N/mm$^2$. An elasticity modulus perpendicular to the hardwood layers, when compressively stressed, is advantageously between 2250 and 2850 N/mm$^2$. An elasticity modulus parallel with the hardwood layers, when compressively stressed, is advantageously between 5500 and 6500 N/mm$^2$. It has been demonstrated that synthetic resin densified wood having the above-mentioned material characteristics is particularly suitable for the beam connectors according to the invention. In particular, connector plates from steel can be replaced without a problem by the connectors according to the invention from synthetic resin densified wood. The embedded strength, i.e. the stress bearing of a hole can withstand, is at least 150 N/mm$^2$.

BRIEF DESCRIPTION OF THE DRAWINGS

Further features and advantages of the invention are derived from the claims and from the description hereunder of a preferred embodiment of the invention in conjunction with the drawings. Individual features of the various embodiments herein can be combined in an arbitrary manner without departing from the scope of the invention. In the drawings:

DETAILED DESCRIPTION

Figure 1:
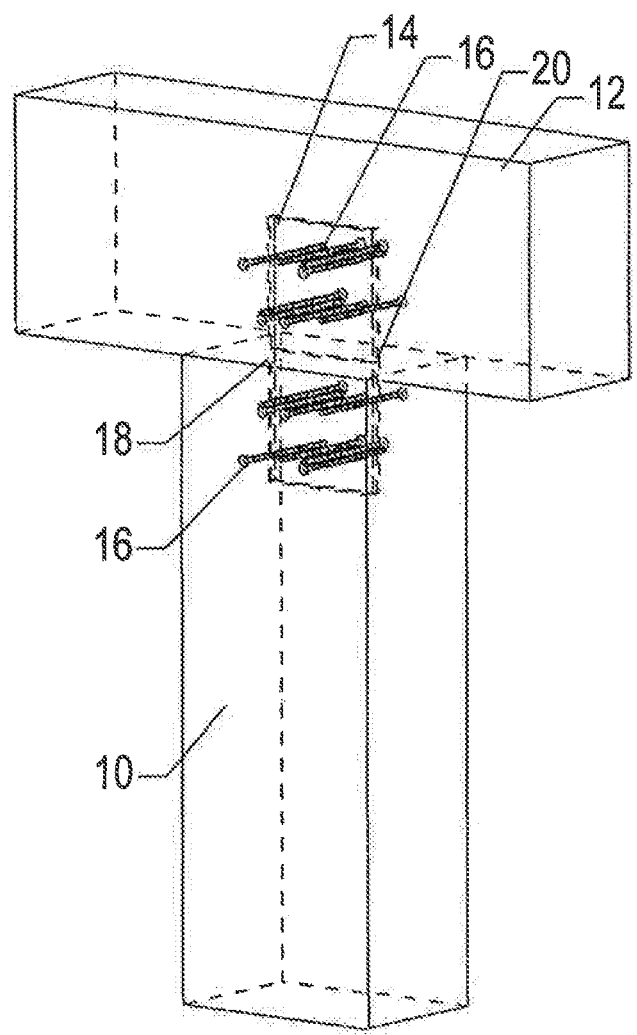
FIG. 1 shows a view from obliquely above of a beam connection having a connector according to the invention.

The illustration of FIG. 1 shows a connection between a first beam 10 and a second beam 12, wherein the second beam 12 is placed onto the end side of the first beam 10 such that a T-shaped arrangement results. The beams 10, 12 are configured either as solid wood beams or as glued laminated wood beams.

The beams 10, 12 are illustrated so as to be transparent such that a connector 14 that is disposed between the beams 10, 12 can be seen. The connector 14 per se would not be visible and is therefore illustrated with dashed lines. Furthermore, a plurality of screws 16 which fix the connector 14 in relation to the beams 10, 12 are illustrated with solid lines. These screws are illustrated with solid lines even while said screws per se would be visible only in the region of their respective screw heads on that side of FIG. 1 that faces the observer.

The connector 14 has the shape of a rectangular plate and is inserted in slots 18, 20 which are only indicated in the illustration of FIG. 1. A slot 18 is incorporated in the beam 10 so as to emanate from the upper end side of said beam 10, and a second slot 20 is incorporated in the beam 12. The two slots 18, 20 conjointly result in a clearance in the form of a rectangular plate which is only slightly larger than the connector 14.

Once the slots 18, 20 have been incorporated into the beams 10, 12 the connector 14 is inserted, for example, into the slot 18 of the beam 10. The beam 12 is then placed onto the beam 10 such that the connector 14 is simultaneously guided into the slot 20 of the beam 12.

By contrast to conventional beam connections in which steel plates are used as connectors, the connector 14 is composed of synthetic resin densified wood. The connector is composed of a plurality of hardwood layers disposed on top of one another and synthetic resin. The hardwood layers are adhesively bonded to one another by means of the synthetic resin and are at least in portions also penetrated by the synthetic resin. On account thereof, the connector 14 is extremely capable of bearing loads and above all can transmit the compressive and tensile loads which arise after the installation of the beams 10, 12 in a wooden framework structure of a building between the beams 10, 12. It is surprisingly possible herein for the forces that arise between the beams 10, 12 in the beam structure of a wood construction to be transmitted by means of the connector 14 which is composed of synthetic resin densified wood. The load bearing capability of the beam connection having the connector 14 herein is approximately identical to the load bearing capability of beam connections having conventional connectors from steel plates.

Upon insertion into the slots 18, 20 the connector 14 is then fixed by means of a plurality of wood screws 16 in relation to the beams 10, 12. To this end, the wood screws 16 are screwed perpendicularly to the comparatively large surfaces of the connector 14 through the beam 10 and the connector 14, or through the beam 12 and through the connector 14, respectively. The screws 16 herein are screwed through the beams 10, 12 and the connector from the front side that in FIG. 1 faces the observer, as well as through the rear side of the beams 10, 12 that faces away from the observer. The particular advantage of the connector 14 according to the invention herein also lies in that conventional wood screws 16 can be used. The wood screws 16 can indeed be readily screwed into the beams 10, 12 composed of solid wood or glued laminated wood, and the screws are also configured such that said screws penetrate the connector 14 composed of synthetic resin densified wood without pre-drilling. The beams 10, 12 upon insertion of the connector 14 consequently do not have to be pre-drilled. Pre-drilling or partial pre-drilling of the beam and/or of the connector can be provided in the context of the invention, for example in order for the screwing-in torque required to be reduced.

The connector 14 is fixed in relation to the beams 10, 12 after the screws 16 have been screwed in, and the connection between the two beams 10, 12 is capable of being fully stressed by loads.

Figure 2:
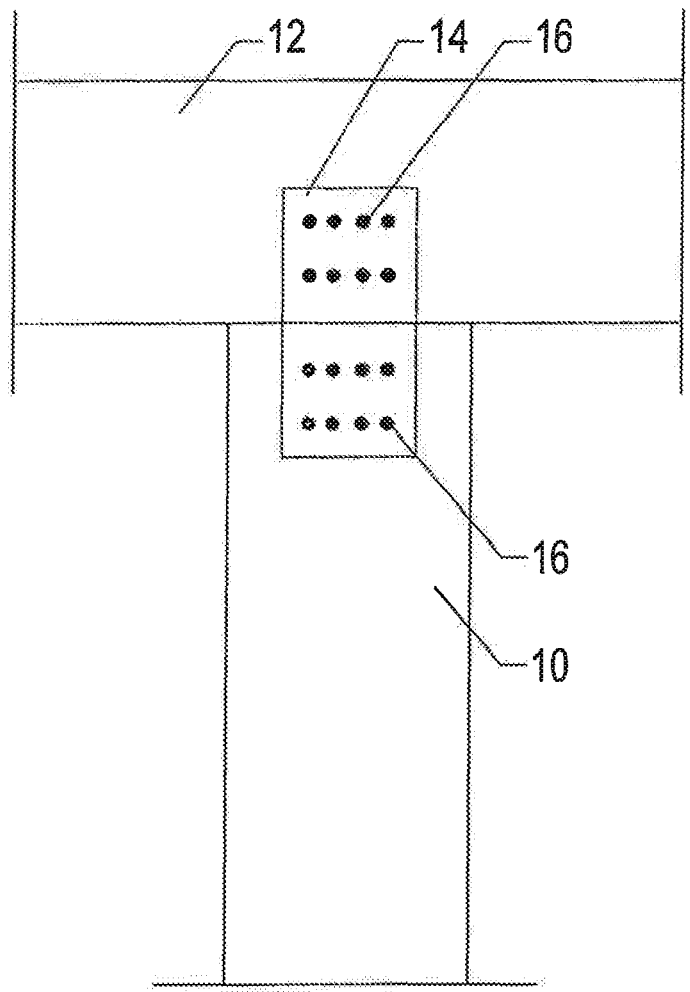
FIG. 2 shows a front view of the beam connection of FIG. 1.

The illustration of FIG. 2 shows a front view of the connection of FIG. 1. The beams 10, 12 are again illustrated so as to be transparent such that the connector 14 lying within the beams 10, 12 can be seen.

The connector 14 is fixed in relation to the beam 12 by a total of eight wood screws 16 and the connector 14 is also fixed in relation to the beam 10 by a total of eight wood screws 16. The wood screws 16 herein are mutually disposed in parallel rows of in each case four screws. Each second screw in each row is advantageously inserted from the opposite side. Thus, the screw on the extreme left in the topmost row of screws 16 in FIG. 2 would thus be inserted from the front side that faces the observer. The following screw on the right would then however be inserted from the rear side that faces away from the observer. An alternating insertion of the screws of this type can then be performed across the total of four rows of screws 16, wherein in the illustration of FIG. 2 the insertion direction of the screws can additionally also be alternated in the direction from top to bottom.

Figure 3:
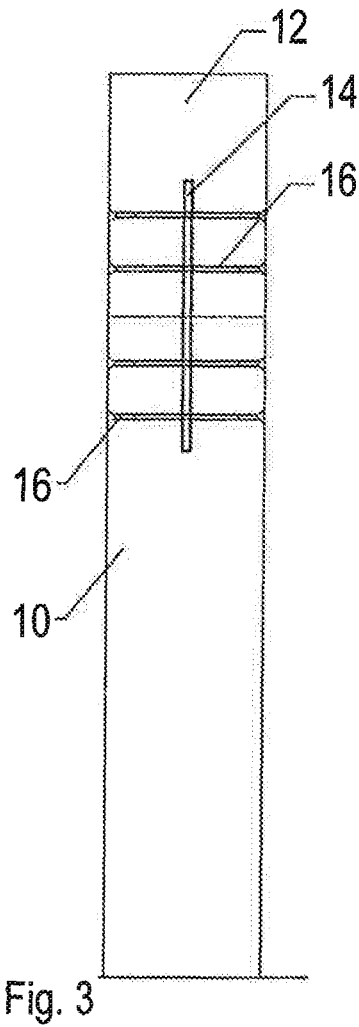
FIG. 3 shows a lateral view of the beam connection of FIG. 1.

The illustration of FIG. 3 shows the connection of FIG. 1 from the side, wherein the beams 10, 12 are again illustrated so as to be transparent such that the connector 14 and the screws 16 can be seen.

Figure 4:
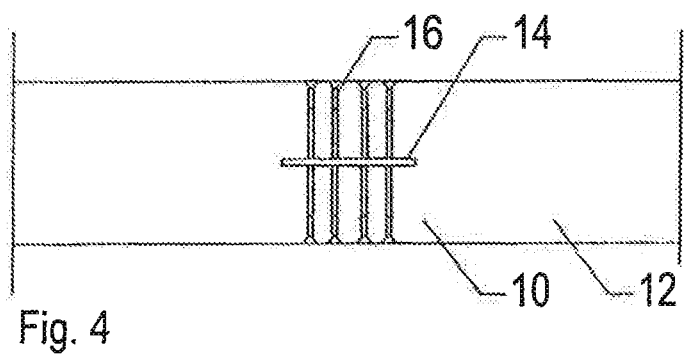
FIG. 4 shows a plan view of the beam connection of FIG. 1.
Figure 5:
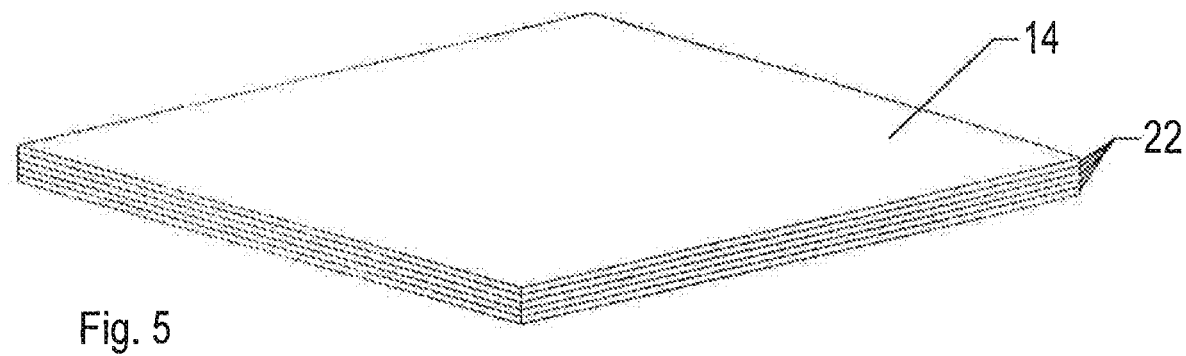
FIG. 5 shows a view from obliquely above of the connector.

The illustration of FIG. 4 shows the connection of FIG. 1 from above. The beams 10, 12 are again illustrated so as to be transparent such that the connector 14 and the screws 16 can be seen. Since a total of four screws are disposed on top of one another, or behind one another in the viewing direction of FIG. 4, respectively, the screws are drawn so as to be on top of one another. Each screw 16 however has a tip on one end and a head that is widened in relation to the tip at the opposite end.

FIG. 4 shows the connector 14 from obliquely above. A plurality of hardwood layers 22 which are connected by means of synthetic resin (not illustrated) and at least in portions are penetrated by the synthetic resin can be seen. The connector 14 after the pressing and curing of the synthetic resin is extremely capable of bearing a load and can be used instead of a conventional steel-plate connector.

The connector 14 is usually cut out from already completed board material. This can be performed by means of conventional woodworking tools.

Figure 6:
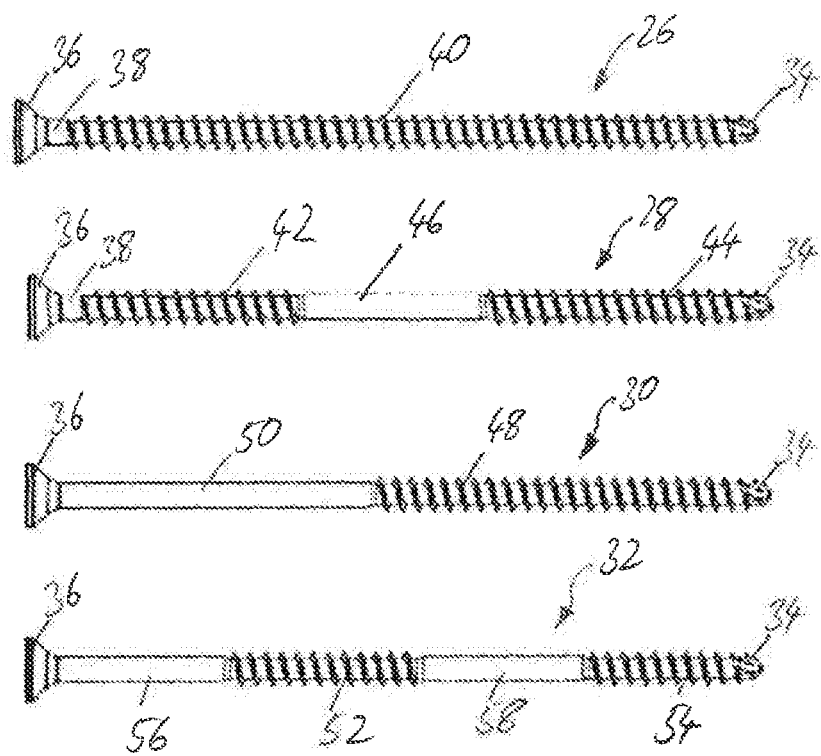
FIG. 6 shows a plurality of lateral views of wood screws for the connector set according to the invention.

FIG. 6 shows a plurality of wood screws 26, 28, 30, and 32, which can be used in the method according to the invention and can be part of the connector set according to the invention. All wood screws 26, 28, 30, and 32 have a drill tip 34 which can be configured either as a drill tip having a classic drill bit geometry or else as a rolled tip having scraper ribs. Each of the wood screws 26, 28, 30, and 32 is moreover provided with a screw head 36, wherein all screw heads 36 are configured as countersunk heads. The screw 26 is configured as a so-called fully threaded screw and with the exception of the drill tip 34 and of a very short cylindrical portion 38 directly below the screw head 36 has a continuous wood thread 40.

The wood screw 28, apart from the drill tip 34 and the cylindrical portion 38 directly below the screw head 36, has two threaded portions 42 and 44 and a cylindrical thread-free portion having a smooth external face 46 that lies between the two threaded portions 42, 44. The threaded portion 42 herein lies between the portion 38 and the thread-free portion 46, and the threaded portion 44 lies between the thread-free portion 46 and the drill tip 34.

The wood screw 28 can be used, for example, for fastening a connector that is disposed so as to be centric in a beam. The connector in the completely assembled state of the wood screw 28 is then penetrated by the thread-free portion 46. Fastening of the connector which largely corresponds to the fastening using a rod dowel is possible on account thereof.

The wood screw 30 is provided with a threaded portion 48 emanating from the drill tip and with a thread-free portion 50 which extends from the head end of the threaded portion 48 up to the screw head 36.

The wood screw 32 is provided with two threaded portions 52, 54, and two thread-free portions 56, 58. A thread-free portion 56 initially follows, so as to proceed from the screw head 36. The first threaded portion 52 adjoins the thread-free portion 56. A thread-free portion 58 again follows the threaded portion 52. A second threaded portion 54 which extends up to the drill tip 34 then follows the thread-free portion 58. The threaded portions, 52, 54 are of approximately identical lengths, and the thread-free portions 56, 58 are also of approximately identical lengths.

The same thread is provided in the threaded portions in the case of all wood screws 26, 28, 30, 32, The wood screws 26, 32 having a plurality of threaded portions 42, 44, 52, 54 thus also always have the same wood thread having the same screw pitch.

Figure 7:
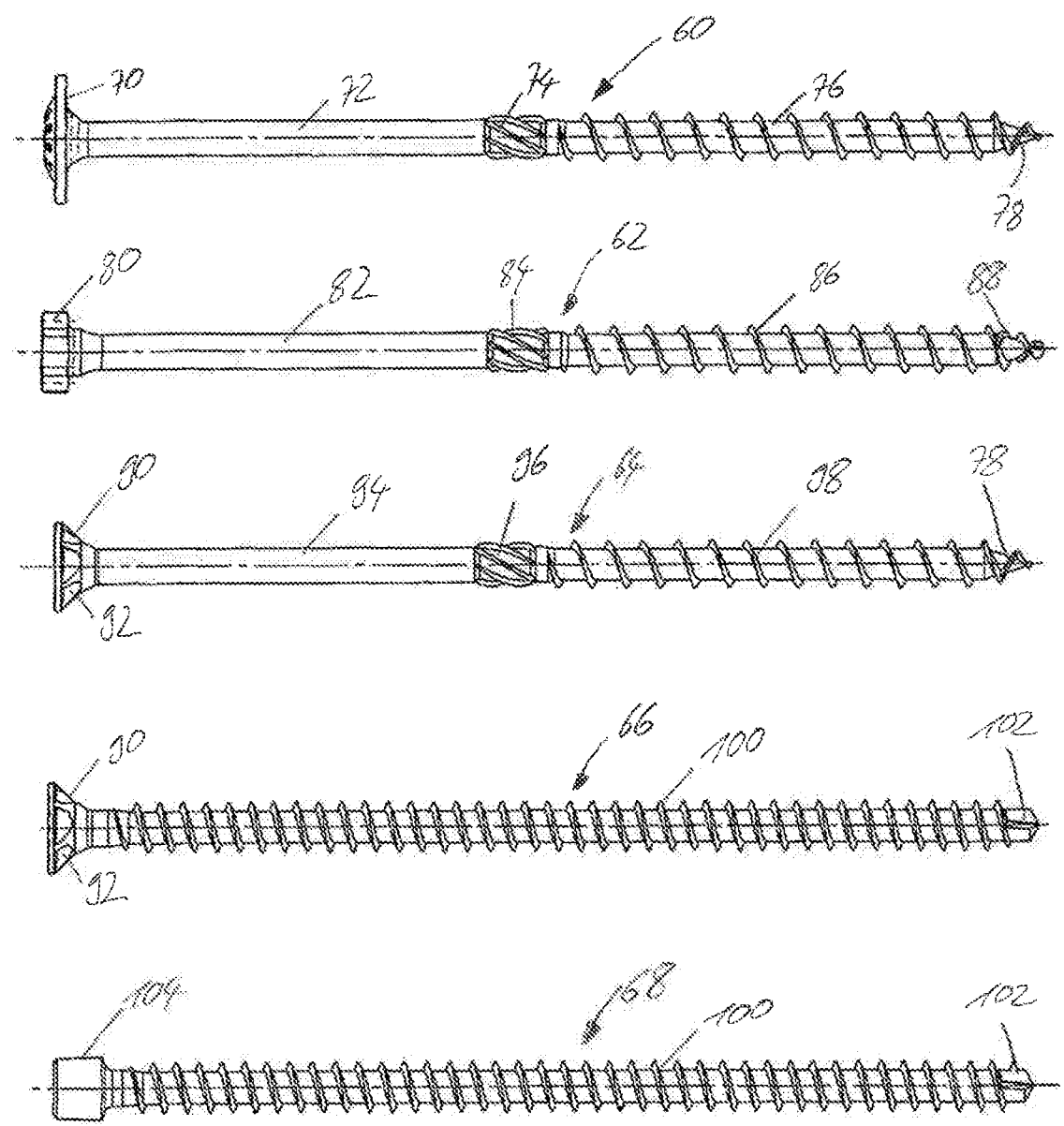
FIG. 7 shows a plurality of lateral views of further wood screws for the connector set according to the invention.

The illustration of FIG. 7 shows five further wood screws 60, 62, 64, 66, 68 which can be used in a method according to the invention and which can be part of a connector set according to the invention.

The wood screw 60 has a disk-shaped head 70, the latter being adjoined by a thread-free portion 72. A router portion 74 having a steep thread follows the thread-free portion 72. A threaded portion 76 is then disposed from the router portion 74 up to the tip of the screw. Scraper ribs 78 that run in a manner opposed to the wood thread are disposed in the conically tapered tip of the screw 60.

The wood screw 72 has a hexagonal head 80 which is followed by a thread-free portion 82. A router portion 84 having a steep thread is disposed between the thread-free portion 82 and a threaded portion 86. The threaded portion 86 extends up to the conically tapered tip of the screw, wherein in addition to the normal wood thread an opposed thread 88 is disposed on the conically tapered tip.

The wood screw 64 has a countersunk head 90 which is provided with a plurality of router pockets 92. A thread-free portion 94 follows the countersunk head 90, said thread-free portion 94 again being adjoined by a router portion 96 having a steep thread. The router portion 96 is followed by a threaded portion 98 which extends up to the conically tapered tip of the screw. Scraper ribs 78 which are opposed to the actual thread are disposed on the tip of the screws.

The screw 66 is configured as a fully threaded screw, and a threaded portion 100 extends between the screw head 90 which is configured having the router pockets 92. A drill tip 102 is disposed on that end of the wood screw 66 that is opposite the screw head 90. The drill tip 102 has a conventional drill geometry having two primary cutters and two secondary cutters. The drill tip 102 is produced by pinching, for example. The wood screw 68 differs from the wood screw 66 only in terms of the configuration of the screw head 104 thereof. The threaded portion 100 and the drill tip 102 are configured in a manner identical to that of the wood screw 66. The screw head 104 is configured so as to be approximately cylindrical, having a smooth external circumference.

Individual features of the wood screws illustrated in FIGS. 6 and 7 can be mutually combined in an arbitrary manner without departing from the scope of the invention. All wood screws illustrated in FIGS. 6 and 7 are suitable for being screwed into beams without pre-drilling and also for penetrating the connectors.

The invention claimed is:

1. A method for connecting beams from solid wood or glued laminated wood, comprising the steps of:
   producing slots in the beams;
   introducing a connector made from synthetic resin densified wood into the slots; and
   fixing the connector in the slots by means of wood screws driven through each beam and the connector.

2. The method as claimed in claim 1, wherein the wood screws when fixing the connector are screwed into the beams and the connector without pre-drilling the beams and the connector.

3. The method as claimed in claim 1, wherein wood screws having drill tips are used.

4. The method as claimed in claim 1, wherein wood screws having a full thread are used.

5. The method as claimed in claim 1, wherein wood screws having at least one thread-free portion are used.

6. The method as claimed in claim 5, wherein the wood screws are arranged such that the connector in the finally assembled state is penetrated by a thread-free portion of the wood screws.

7. A connector set for beams of wood material, in particular for connections that are under a compressive as well as a tensile load, wherein the connector set has at least one connector with at least one plate-shaped portion for insertion into prefabricated slots in the beam or the beams, wherein at least the plate-shaped portion of the connector is composed of synthetic resin densified wood, and wherein the synthetic resin densified wood is composed of a plurality of hardwood layers disposed on top of one another and synthetic resin, wherein the connector set has a plurality of wood screws which are driven through each beam and the connector for fixing the at least one connector in the beams.

8. The connector set as claimed in claim 7, wherein the plurality of wood screws have in each case one drill tip.

9. The connector set as claimed in claim 7, wherein the wood screws are configured as fully-threaded screws.

10. The connector set as claimed in claim 7, wherein the wood screws have at least one thread-free portion.

11. The connector set as claimed in claim 10, wherein at least one thread-free portion is disposed between two threaded portions.

12. The connector set as claimed in claim 7, wherein the synthetic resin is a duromeric synthetic resin.

13. The connector set as claimed in claim 7, wherein the synthetic resin densified wood has an embedded strength, at the plurality of wood screws fixing the at least one connector in the beams, of at least 150 N/mm$^2$.

14. The connector set as claimed in claim 7, wherein the synthetic resin densified wood has a tensile strength parallel with the hardwood layers between 100 N/mm$^2$ and 150 N/mm$^2$.

15. The connector set as claimed in claim 7, wherein the synthetic resin densified wood has a compressive strength parallel with the hardwood layers between 110 and 150 N/mm$^2$.

16. The connector set as claimed in claim 7, wherein the synthetic resin densified wood has a compressive strength perpendicular to the hardwood layers between 250 and 310 N/mm$^2$.

17. The connector set as claimed in claim 7, wherein the synthetic resin densified wood, when flexurally stressed, has an elasticity modulus perpendicular to the hardwood layers between 15,500 and 18,500 N/mm$^2$.

18. The connector set as claimed in claim 7, wherein the synthetic resin densified wood, when compressively stressed, has an elasticity modulus perpendicular to the hardwood layers between 2250 and 2850 N/mm$^2$.

19. The connector set as claimed in claim 7, wherein the synthetic resin densified wood, when compressively stressed, has an elasticity modulus parallel with the hardwood layers between 5500 and 6500 N/mm$^2$.

* * * * *